Sept. 1, 1931.  G. B. WATKINS  1,821,598
LAMINATED GLASS
Filed July 5, 1929
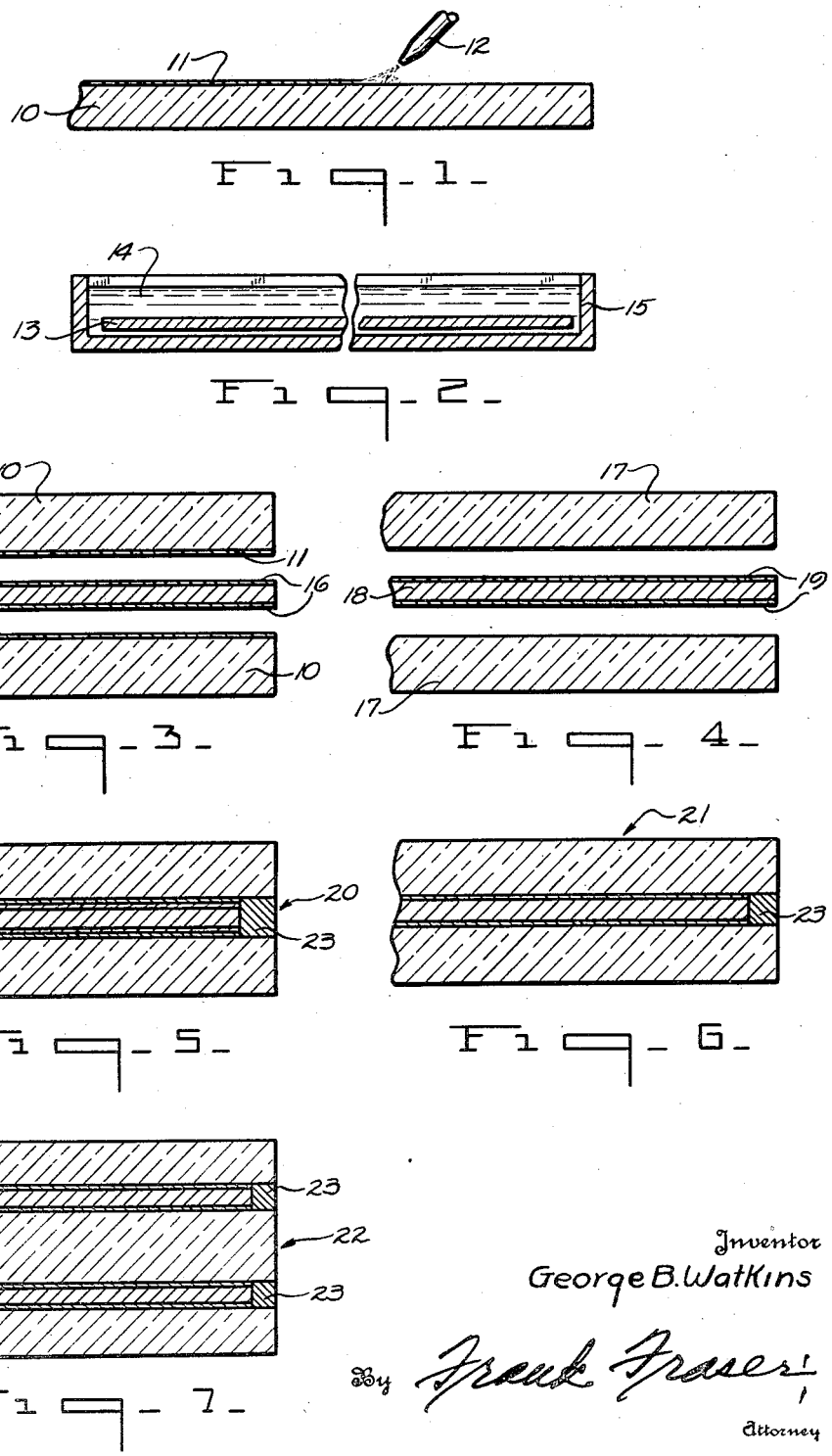
Inventor
George B. Watkins
By Frank Fraser
Attorney Patented Sept. 1, 1931

1,821,598

UNITED STATES PATENT OFFICE

GEORGE B. WATKINS, OF TOLEDO, OHIO, ASSIGNOR TO LIBBEY-OWENS-FORD GLASS COMPANY, OF TOLEDO, OHIO, A CORPORATION OF OHIO

LAMINATED GLASS

Application filed July 5, 1929. Serial No. 376,050.

The present invention relates to laminated glass and to the process of producing the same. Laminated or composite glass is commonly called in the art "non-shatterable" or "non-scatterable" glass. Such glass is ordinarily produced by uniting two or more sheets or plates of glass and one or more none-brittle membranes. The value of such a composite sheet of glass is dependent to a considerable degree upon the quality and permanency of the bond between the several laminations. It is essential that the bond be such that one or more of the glass sheets can be broken or shattered without separating from the non-brittle portion.

The bond between the laminations, to be satisfactory from a commercial standpoint, must be such that it will not be affected adversely by climatic conditions encountered in actual use.

It has been found that laminated glass produced in accordance with some processes, subsequent to its manufacture, frequently develops a separation of the glass from the non-brittle substance. These "let-goes" may occur around the marginal portions of the sheet and work inwardly thereof or may occur in any part of the composite sheet. The "let-goes" result from a breaking down of the bond between the laminations so that at the point of the "let-go", there is no further bond or union.

It has also been noticed that an undesirable condition may present itself in the composite sheet due to the appearance of bubbles. To unite two sheets of glass and a sheet of non-brittle material in a manner that an apparently excellent bond is obtained between the various laminations offers no grave problem. That is, laminations can be bonded together by the aid of some binding material, the bond between the laminations to all intents and purposes appearing satisfactory upon the completion of the composite sheet, at which time the composite sheet may be devoid of "bubbles", "let-goes", and so forth. The mechanical and physical properties of the composite sheet when completed, however desirable they may be, do not necessarily establish or determine that such sheet will retain its desirable properties when subjected to varying and adverse conditions of use. To determine the value of such bond, it is advisable to ascertain whether or not the product will hold up when subjected to atmospheric conditions in actual use, such as extreme high and low temperatures, seasonal changes, and atmospheric conditions, particularly sunlight. As an example, it has been found that a sheet of laminated glass may withstand exceptionally high temperatures, as encountered in use, without bubbling or developing "let-goes" and yet when subjected to relatively low temperatures, will become relatively brittle and no longer possess the non-shatterable qualities desired. On the other hand, a composite sheet may be produced that will be non-shatterable at low temperatures but when subjected to relatively high temperatures, as encountered in use, will develop "let-goes" and "bubbles" or both. It has been found that the presence of relatively low boiling point, high vapor pressure solvents in the laminated glass, such as for example, acetone, amyl acetate, alcohol, or fusel oil, will render such sheet to a marked degree susceptible to bubbling.

In laminating processes where the non-brittle membrane is a cellulose composition material, a solvent or softening agent for the non-brittle membrane is commonly used. The softening agent is applied to the non-brittle material, after which the sheets of glass and treated material are brought together in proper superimposed relationship and then subjected preferably to the combined action of heat and pressure to form a composite sheet. In following this procedure, great care has to be taken, such as regulating the time the non-brittle material is acted upon by the solvent or mixture of solvents before pressure is applied to the "sandwich", otherwise the non-brittle membrane will be extruded to a marked degree beyond the edges of the glass sheets during the laminating process. The term "sandwich" is used to designate the laminations as a group when arranged in proper superimposed relationship before they have been bonded together to produce the finished composite sheet. This extruding condition sets up internal strains in the finished composite sheet, frequently causing the finished product to develop "after-cracks", i. e., a breakage of one or more of the glass sheets. This condition is more pronounced with solvents or mixture of solvents that penetrate the non-brittle material to a marked degree during the laminating process.

The present invention contemplates the use of a bonding material or medium for the various laminations which will produce a finished product or composite sheet adapted for general use under varying climatic conditions, without developing undesirable defects such as "bubbles", "let-goes", and "after-cracks" as heretofore pointed out. With bonding medium of this character, two or more sheets of glass and one or more membranes formed from a cellulose composition material can be united preferably under the combined action of heat and pressure in a manner that a satisfactory bond will result.

In fashioning a laminated or composite sheet in accordance with the present invention, two or more sheets or plates of glass previously cleansed are brought together with an interposed layer of non-brittle membrane, formed from a cellulose composition material. This non-brittle membrane may appear in several ways, for instance,—

(1) The inner surface of each sheet of glass may be sprayed or otherwise coated with a skin or plurality of skins of cellulose composition material.

(2) The inner surfaces of each sheet may remain uncoated and brought together with an interposed sheet of cellulose composition material.

(3) The inner surfaces of each sheet of glass may be sprayed or otherwise coated with a skin of cellulose composition material. A sheet of cellulose composition material is then interposed between the skin coated surfaces of the glass sheets.

Irrespective of the manner in which the cellulose composition material skin may be applied or whether there be undercoatings or underskins of other materials, it will be observed that in any of the cases illustrated at least a single surface of cellulose composition material, whether it be the surface of such a skin or surface of such a sheet, is to form one of the bonded surfaces.

The present invention contemplates the establishment of a bond between the surfaces to be joined by the use of a bond inducing medium having little, if any, inherent adhesive properties, the use of such an inductor operating to effect a softening of the surface of the cellulose composition material. It is believed that the adverse condition of bubbling, heretofore referred to, can, to a marked extent, be minimized, if not wholly eliminated, by the use of a bond inducing medium having a relatively high boiling point, low vapor pressure. Apart from other causes of bubbling, it has been found that the use of solvents or softeners having high vapor pressures tend to produce the adverse bubbling condition in the completed composite sheet. If a solvent of low boiling point be utilized, ordinarily a too rapid attack upon the cellulose surface will be obtained during the fashioning operation. Such a condition tends to promote an extrusion or flowing of the interposed membrane under the action of the press. This flowing in turn renders liable a cracking of one or more of the glass sheets owing to a relief in pressure applied to the several portions of the sheet. The flowing may also occasion a strained or tensioned condition in the completed composite sheet resulting in "after cracking".

Assuming that it is desired to fashion a composite sheet from two or more sheets or plates of glass and one or more non-brittle membranes, the use of an amide having a relatively high boiling point and low vapor pressure as a bond inducing medium is proposed, the vapor pressure of the amide being sufficiently low that it will not have a deleterious effect upon the finished sheet when in use. The following amides are set forth by way of example:

Diethyl di phenylurea
N-ethylacetanilide (mannol)
P-toluene sulfoneamide

Although the present invention contemplates the use of amides broadly, for simplicity of description the use of n-ethylacetanilide (mannol) as the bond inducing medium will be discussed.

It is preferred that the non-brittle substance used be a cellulose composition material, which expression, of course, includes pyroxylin plastic. The amides are good bond inducing mediums for producing laminated glass when a cellulose composition material is used in the non-brittle portion of the composite sheet.

In the drawings wherein like numerals are employed to designate like parts throughout the same, Fig. 1 is a diagrammatic view showing the creation of a skin on a sheet of glass, Fig. 2 shows diagrammatically one way of applying the bond inducing medium to a non-brittle membrane, Fig. 3 is a fragmentary sectional view showing the laminations before they are united and including skin coats on the glass sheets, Fig. 4 is a similar view without using the skin coats, Fig. 5 is a sectional view of the laminations in Fig. 3 after they have been united, Fig. 6 is a sectional view of the laminations in Fig. 4 after they have been united, and Fig. 7 is a sectional view of a sheet of "bullet-proof" glass.

The three amides listed above are solids at ordinary room temperatures. In accordance with the present invention, a solvent is used to reduce the solid plasticizer to liquid form so that it may be applied in liquid form in a manner to create a skin coat on a sheet of glass, a sheet of pyroxylin plastic, or both. Although any suitable solvents may be used for making liquids out of the solid plasticizers, by way of example, I mention that ethyl alcohol may be used as a solvent for diethyl di phenylurea, ethyl acetate as a solvent for ethylacetanilide (mannol), and toluene as a solvent for p-toluene sulfoneamide.

The use of an amide as a bond inducing medium is desirable for several reasons: First, the fact that the plasticizer is normally a solid at room temperatures is of advantage; and secondly, amides are alkaline in nature so that they tend to neutralize the acid in the cellulose composition material. This tends to prevent disintegration and discoloration of the pyroxylin plastic, giving a longer life and a more satisfactory sheet of laminated glass.

To fabricate a laminated or composite sheet of glass, one surface of each sheet of glass 10 in Fig. 1 may be provided with a skin coat 11, or not, as desired. A skin coat may be formed on the glass sheets by spraying with the means 12 or otherwise depositing a coating of some suitable material such as a cellulose composition material on the glass sheets in a manner to create a skin. Although a cellulose composition material is preferred as a skin coat, it will be understood that other types of materials can be used either alone as a skin coat or as undercoatings for the cellulose composition material skin.

A sheet of cellulose composition material 13 is then coated with a film of n-ethylacetanilide (mannol) which may be applied by dipping, spraying, or otherwise applying the same. In Fig. 2, a bath of the amide 14 is contained in the receptacle 15, and by dipping the sheet as shown, the sheet will be properly covered on both sides. As has above been set forth, the amides mentioned are normally solid at room temperatures, and to reduce them to liquid form they are dissolved in a suitable solvent or mixture of solvents. Either a high boiling point or low boiling point solvent can be used to place the plasticizer in solution because after the film of amide has been created on the pyroxylin plastic sheet, skin coat, or bare surface of the glass, it is allowed to dry whereby to remove or evaporate the solvents and to leave a film or deposit of substantially solid plasticizer. The film of plasticizer, in addition to being applied by means of dipping, can be created by means of a spray or the like. Spraying of the liquid has certain advantages in that it is relatively easy to accurately control the amount of bond inducing medium. Also, some of the more volatile solvent is evaporated off during the spraying operation. The solvent used may also be one that is relatively active upon the pyroxylin plastic so that as the bond inducing medium is sprayed upon the plastic sheet, it will be slightly pitted. I have found that this slight surface pitting is desirable because it tends to cut down or reduce to a minimum the appearance of waves in the finished composite sheet.

After the non-brittle sheet has been suitably treated with the amide, it may be interposed between the skin coated surfaces of the glass sheets as indicated in Fig. 3, and the sandwich thus formed placed in a suitable laminating apparatus. In Fig. 3, it will be noted that the non-brittle membrane 13 carries the film 16 of n-ethylacetanilide (mannol). The apparatus is preferably then so controlled that the sandwich is subjected to the combined action of heat and pressure whereby to bond the laminations together to form a finished composite sheet.

Although various periods of time, pressure, and range of temperatures may be used to produce satisfactory laminated or composite glass, I prefer that the sandwich be subjected to a pressure of approximately one hundred pounds per square inch for approximately fifteen minutes at a temperature of approximately 220 degrees Fahrenheit.

While the use of skin coats on the glass sheets has been described, a laminated sheet can be produced without such skin coats. That is to say, an amide treated sheet of non-brittle material can be interposed between previously cleansed surfaces of the glass sheets to produce a sandwich, which sandwich is subjected to the combined action of heat and pressure to produce a composite sheet. Note Fig. 4 wherein the glass sheets 17 are not provided with skin coats. However, the non-brittle membrane 18 carries the films 19 of n-ethylacetanilide (mannol).

The amides disclosed in this application have a sufficiently high boiling point and sufficiently low vapor pressure that the composite sheet will not bubble when in use in a manner to render the sheet of glass unsatisfactory. Also, due to the alkalinity of the amides, they tend to neutralize the acid contained in the pyroxylin plastic sheet which is of course a very desirable condition. This is particularly important because if a permanent bond is obtained between the laminations of a composite sheet and one of the laminations is formed from a cellulose compound, the life of the composite sheet will be more or less governed by the life of the cellulose compound itself. Therefore, the amide will tend to prolong the life of the composite sheet.

As shown in Figs. 5, 6 and 7, the finished sheets 20, 21 and 22 respectively are protected by the seals which protect the bond between the laminations from atmosphere, etc. The seals may be made from any suitable water-proofing material such as pitch or the like.

I claim:

1. As a new article of manufacture, a sheet of laminated glass consisting of two or more sheets of glass with an interposed non-brittle material treated with an amide having a relatively high boiling point, low vapor pressure, the vapor pressure, being sufficiently low that the sheet will not bubble when subjected to varying climatic conditions encountered in actual use.

2. As a new article of manufacture, a sheet of laminated glass consisting of two or more sheets of glass with an interposed non-brittle material treated with n-ethylacetanilide (mannol).

Signed at Toledo, in the county of Lucas and State of Ohio, this 1st day of July, 1929.

GEORGE B. WATKINS.